Patented Aug. 24, 1926.

1,596,965

UNITED STATES PATENT OFFICE.

FRANK B. GRIFFIN, OF OSHKOSH, WISCONSIN.

FILM CEMENT.

No Drawing.   Application filed December 31, 1923. Serial No. 683,730.

This invention relates to improvements in film cement, particularly adapted for cementing inflammable moving picture celluloid films.

The several ingredients comprising this improved film cement and the relative proportions of the same, as well as the manner in which the same are mixed, will be made more apparent as this description proceeds.

As an ingredient in the formula for my improved film cement I employ collodion, the ingredients constituting the same being by my measure as follows:—gun cotton—90 grains, ether—9¼ ounces, alcohol—6¾ ounces. Of collodion produced from the above formula I take 3 drams and add thereto ½ dram of pure acetic ether, (ethyl acetate); ¼ dram of alcohol (ethyl alcohol or grain alcohol); 4 drams of pure amyl acetate; ¼ dram of ether and 10 drops of acetone (dimethyl ketone).

In mixing the ingredients outlined above, the collodion is first made, whereupon the required amount, that is 3 drams is placed in a suitable receptacle, to which there is added ½ dram of acetic ether, this mixture being then thoroughly stirred. There is then added ¼ dram of alcohol, the mixture being again thoroughly stirred.

In a separate receptacle, a solution consisting of 4 drams of amyl acetate and ¼ dram of ether are mixed, these chemicals being also thoroughly stirred. To this solution there is then added the solution consisting of the collodion, acetic ether and alcohol, and the two solutions stirred until thoroughly mixed. Ten drops of acetone are then added and the mixture again thoroughly stirred.

The result of this mixture is a film cement, which finds particular utility in connection with cementing inflammable celluloid moving picture films and the like. When the solution is first prepared, it is clear, transparent and colorless. However, a short time later, it turns yellowish, still, however, remaining clear.

It might be mentioned that in the formula for collodion the gun cotton is measured by troy or apothecaries' weight, that is 480 grains to the ounce, while the fluid measures employed are in accordance with the U. S. standard measure of 8 fluid drams to the ounce.

While the above described manner of mixing the several ingredients has been found to produce entirely satisfactory results, I find that satisfactory results may likewise be obtained by mixing the several ingredients in the following manner.

The required amount of collodion is first placed in a receptacle, and to this there is added the acetic ether (ethyl acetate), this mixture being thoroughly stirred and mixed. To this I add the ethyl alcohol, stirring the whole solution well together. The amyl acetate is then added and the solution again stirred well. Ether is then added and the mixture again stirred well.

The mixture is then permitted to stand in a stoppered bottle for approximately 60 hours, during which time it turns slightly yellowish, becoming clearer as a result of the chemicals becoming more thoroughly dissolved. At the end of this period the acetone (dimethyl ketone) is added and thoroughly mixed. If desired a stock solution, including collodion, acetic ether, (ethyl acetate) and alcohol (ethyl alcohol) may be produced by mixing the ingredients in the order named and thoroughly stirring the same, after each step. This mixture can be left in a stoppered bottle for approximately 60 hours.

Thereafter, if it is desired to produce one ounce of film cement, 3¾ drams of the stock solution above defined is added to 4 drams of amyl acetate, thoroughly stirring the mixture, and to this solution ¼ dram of ether is added. In lieu of this the amyl acetate and ether may be mixed up separately and then added to the stock solution, above mentioned. In any event, to this solution there is added 10 drops of acetone, (dimethyl ketone) and the whole mixture thoroughly stirred.

From the foregoing it will be seen that various methods of mixing the several ingredients comprising my improved film cement may be resorted to, the results however, in any event, being substantially the same. I therefore reserve the right to alter the proportions of the several ingredients as well as the manner of mixing the same, to the extent as contemplated by the accompanying claim.

Having thus described the invention, what is claimed is:

A film cement consisting of collodion—3 drams, acetic ether—½ dram, alcohol—¼ dram, amyl acetate—4 drams, ether—¼ dram and acetone—10 drops.

In testimony whereof, I affix my signature.

FRANK B. GRIFFIN.